United States Patent
Azam et al.

(10) Patent No.: US 10,679,557 B2
(45) Date of Patent: Jun. 9, 2020

(54) ADJUSTING FREQUENCIES OF MANIPULATION OF DISPLAY PIXELS

(71) Applicant: HEWLETT-PACKARD DEVELOPMENT COMPANY, L.P., Houston, TX (US)

(72) Inventors: Syed S. Azam, Houston, TX (US); Thong Thai, Houston, TX (US); Mike Provencher, Houston, TX (US); Rahul V. Lakdawala, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 53 days.

(21) Appl. No.: 16/074,550

(22) PCT Filed: Oct. 6, 2016

(86) PCT No.: PCT/US2016/055795
§ 371 (c)(1),
(2) Date: Aug. 1, 2018

(87) PCT Pub. No.: WO2018/067159
PCT Pub. Date: Apr. 12, 2018

(65) Prior Publication Data
US 2019/0043423 A1 Feb. 7, 2019

(51) Int. Cl.
*G06F 1/00* (2006.01)
*G09G 3/3233* (2016.01)
(Continued)

(52) U.S. Cl.
CPC ....... *G09G 3/3233* (2013.01); *G06F 3/04847* (2013.01); *G09G 3/2003* (2013.01);
(Continued)

(58) Field of Classification Search
CPC .. G09G 3/32; G09G 3/22; G09G 3/00; G09G 3/3233
See application file for complete search history.

(56) References Cited

U.S. PATENT DOCUMENTS

| 7,075,242 B2 | 7/2006 | Miller et al. |
| 9,111,489 B2 | 8/2015 | Park et al. |

(Continued)

FOREIGN PATENT DOCUMENTS

| EP | 2453433 A2 | 5/2012 |
| KR | 20140082498 A | 7/2014 |
| WO | 2000033564 A1 | 6/2000 |

OTHER PUBLICATIONS

Bhowmik et al., "System-Level Display Power Reduction Technologies for Portable Computing and Communications Devices", IEEE International Conference on Portable Information Devices, 2007, pp. 1-5.

(Continued)

*Primary Examiner* — Michael A Faragalla
(74) *Attorney, Agent, or Firm* — Trop, Pruner & Hu, P.C.

(57) ABSTRACT

In some examples, an electronic device includes a display panel comprising pixels, and a controller to receive an indication responsive to a user selection of a control element adjustable between settings corresponding to different display quality levels, and in response to the received indication, adjust a frequency of manipulation of the pixels to compensate for deterioration of the pixels.

20 Claims, 5 Drawing Sheets

(51) Int. Cl.
*G09G 3/20* (2006.01)
*G06F 3/0484* (2013.01)
*G06F 3/0488* (2013.01)

(52) U.S. Cl.
CPC ....... *G09G 3/2092* (2013.01); *G06F 3/04886* (2013.01); *G09G 2300/0819* (2013.01); *G09G 2300/0842* (2013.01); *G09G 2320/0233* (2013.01); *G09G 2320/0242* (2013.01); *G09G 2320/0295* (2013.01); *G09G 2320/043* (2013.01); *G09G 2320/046* (2013.01); *G09G 2340/0435* (2013.01); *G09G 2354/00* (2013.01)

(56) References Cited

U.S. PATENT DOCUMENTS

| | | |
|---|---|---|
| 9,311,859 B2 | 4/2016 | Chaji et al. |
| 2005/0237319 A1 | 10/2005 | Ranganathan et al. |
| 2010/0141155 A1 | 6/2010 | Hong et al. |
| 2013/0194199 A1 | 8/2013 | Lynch et al. |
| 2013/0257845 A1* | 10/2013 | Chaji ................... G09G 3/3291 345/212 |
| 2014/0176400 A1* | 6/2014 | Park ..................... G09G 3/3291 345/76 |
| 2015/0339977 A1 | 11/2015 | Nathan et al. |
| 2016/0163255 A1 | 6/2016 | Kim et al. |

OTHER PUBLICATIONS

Fish et al., "Improved Optical Feedback for OLED Differential Ageing Correction", Journal of the Society for Information Display Wiley Online Library, vol. 13, Issue No. 2, Abstract, Retrieved from Internet: http://onlinelibrary.wiley.com/doi/10.1889/1.2012595/abstract, Abstract, Feb. 2005, pp. 1-3.

"Intel Display Power Saving Technology", Wikipedia, Retrieved from Internet—https://en.wikipedia.org/wiki/Intel_Display_Power_Saving_Technology, 2016, 2 pages.

"OLED", Wikipedia, 2016, Retrieved from Internet—https://en.wikipedia.org/wiki/OLED, pp. 1-30.

* cited by examiner

ADJUSTING FREQUENCIES OF MANIPULATION OF DISPLAY PIXELS

BACKGROUND

Electronic devices include display devices to display images. A display device can include an array of pixels, which can be controlled to produce a target image on the display device.

BRIEF DESCRIPTION OF THE DRAWINGS

Some implementations of the present disclosure are described with respect to the following figures.

DETAILED DESCRIPTION

Figure 1:
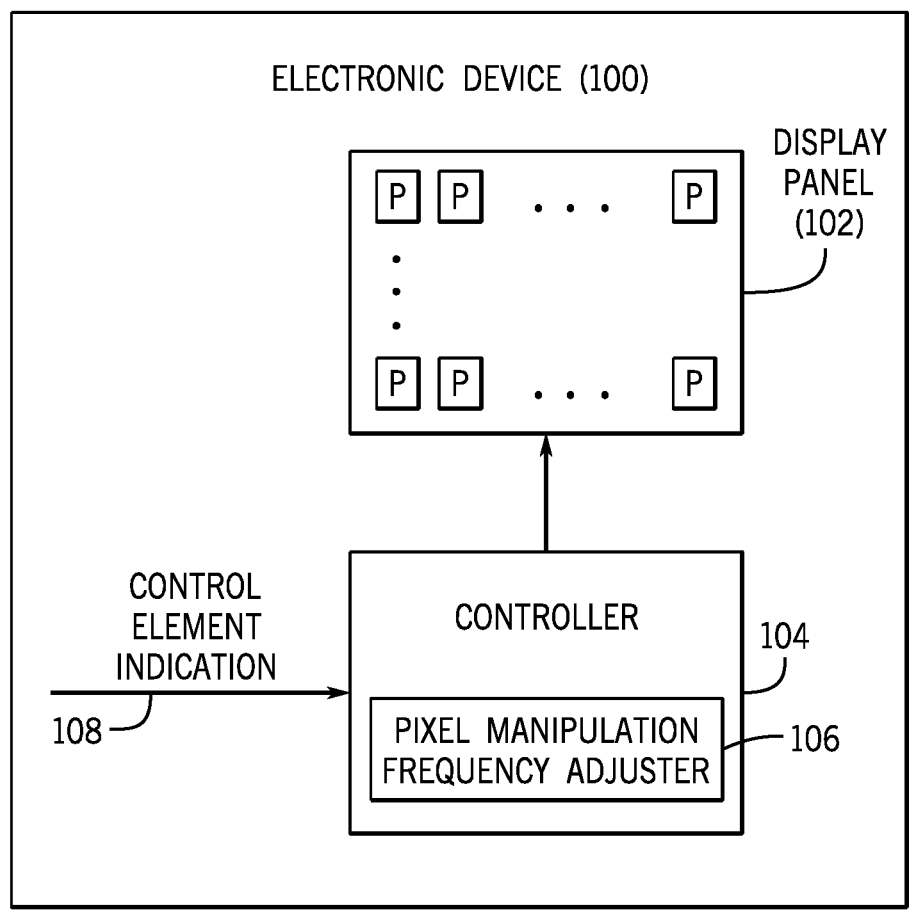
FIG. 1 is a block diagram of an electronic device that includes a controller for controlling manipulation of pixels according to some examples.

In the present disclosure, the article "a," "an", or "the" can be used to refer to a singular element, or alternatively to multiple elements unless the context clearly indicates otherwise. Also, the term "includes," "including," "comprises," "comprising," "have," or "having" is open ended and specifies the presence of the stated element(s), but does not preclude the presence or addition of other elements.

In some examples, display devices can include organic light emitting diode (OLED) display devices. In an OLED display device, an array of pixels includes OLEDs. Each pixel of the array can include OLEDs of different colors. The OLEDs of different colors of each pixel can also be referred to as sub-pixels. An OLED includes an emissive electroluminescent layer, formed of a film of organic material, that is between electrodes. The layers that make up the OLED are arranged on a substrate. An OLED display device can operate without a backlight. When a voltage is applied across the electrodes, an electrical current flows through the emissive electroluminescent layer, which causes the emissive electroluminescent layer to emit light. The amount of light energy emitted by the emissive electroluminescent layer is based on the amount of electrical current passed through the OLED.

Although reference is made to OLED display devices in the present disclosure, it is noted that techniques or mechanisms according to some implementations can be applied to other types of display devices.

Pixels of a display device, such as an OLED display device, can deteriorate with use. Generally, a pixel can include a light emitter that when activated emits light. Some pixels may suffer from burn-in due to displaying a static image by such pixels for too long a time period. Additionally, pixels can suffer from color shift over time, where a color produced by a pixel shifts from one color to another over time. A color shift can cause an image reproduced by the display device to no longer correctly represent colors of the original image. Other types of deteriorations of pixels of a display device are also possible in other examples. More generally, a deterioration of a pixel can refer to a condition of the pixel where the pixel is unable to output light (of a respective color) at a target level, where the target level can include an intensity of light and/or a color of light.

Pixels of a display device can be manipulated to compensate for deterioration of the pixels. Such manipulation can involve a pixel measurement phase followed by a pixel adjustment phase. In the pixel measurement phase, characteristics of the pixels can be measured. In the pixel adjustment phase, pixels that are determined to have deteriorated can be adjusted, such as by adjusting intensities of the pixels.

If performed too frequently, pixel manipulation can consume a relatively large amount of power. In an electronic device powered by a battery, pixel manipulation can deplete the battery. On the other hand, if pixel manipulation is performed too infrequently, then the quality of an image displayed by the display device can suffer.

In accordance with some implementations of the present disclosure, a user-activatable control element can be provided to allow a user to control the frequency of manipulation of pixels of a display device. In some examples, manipulating a pixel can be accomplished by controlling a voltage and/or electrical current applied to the pixel. Note that the manipulation of pixels according to some implementations of the present disclosure does not involve adjusting a backlight source, since the display device may be without any backlight source. Rather, the manipulation of pixels is of individual light emitters of the pixels, which are able to emit light without the use of any backlight source.

The user-activatable control element is adjustable between settings corresponding to different display quality levels. In response to user activation of the control element to different settings of the settings, a controller of the display device can set respective different frequencies of manipulation of the pixels to compensate for deterioration of the pixels. Thus, by activating the control element between the settings, the user can choose to have the display device produce a higher quality image (which comes at the expense of higher power consumption due to greater frequency of pixel manipulation), or to have the display device produce a lower quality image (which allows for reduced power consumption due to a lower frequency of pixel manipulation).

FIG. 1 is a block diagram of an example electronic device 100, which includes a display panel 102 and a controller 104. Examples of the electronic device 100 can include any or some combination of the following: a display device, a desktop computer, a notebook computer, a tablet computer, a handheld device (e.g., a smartphone), a game appliance, a wearable device (e.g., a smart watch, smart eyeglasses, a head-mounted device), or any other type of device that includes a display panel.

The display panel 102 includes an array of pixels (represented by "P"). The controller 104 can be implemented as a hardware processing circuit, or as a combination of a hardware processing circuit and machine-readable instructions executable on the hardware processing circuit. Examples of a hardware processing circuit can include any or some combination of the following: a microprocessor, a core of a multi-core microprocessor, a microcontroller, a programmable gate array, a programmable integrated circuit device, or any other type of hardware processing circuit.

The controller 104 includes a pixel manipulation frequency adjuster 106, which adjusts a frequency of manipulation of pixels to compensate for deterioration of the pixels of the display panel 102. In some examples, the pixel manipulation frequency adjuster 106 can be implemented as a portion of the hardware processing circuit of the controller 104. In other examples, the pixel manipulation frequency adjuster 106 can be implemented as machine-readable instructions executable on the hardware processing circuit of the controller 104.

The controller 104 receives a control element indication 108 that is responsive to a user selection of a control element that is adjustable between settings corresponding to different display quality levels. In response to the received control element indication 108, the pixel manipulation frequency adjuster 106 adjusts a frequency of manipulation of the pixels of the display panel 102 to compensate for deterioration of the pixels.

In some examples, deterioration of the pixels can be indicated by measurements of pixels by a measurement circuit (discussed further below), which can be part of the controller 104. In such examples, the manipulation of pixels to compensate for deterioration of the pixels can be based on the measurements of the pixels provided by the measurement circuit.

In alternative examples, measurements of pixels do not have to be performed. In such alternative examples, a collection of pixels of the display panel 102 can be selected, where pixel manipulation is performed of just the pixels in the selected collection of pixels. The number of pixels in the collection of pixels that can be selected can be adjustable in response to the received control element indication 108, or another received indication. If a higher quality display level is desired, then a larger number of pixels (such as larger percentage of the total number of pixels) can be selected in the collection. If a lower quality display level is selected, such as to achieve enhanced power savings, then a smaller number of pixels (such as smaller percentage of the total number of pixels) can be selected in the collection. In some examples, the collection of pixels selected is a random collection of pixels, in which from the entire population of pixels of the display panel 102, pixels are selected at random to form the random collection of pixels. By using the alternative examples in which pixel measurements do not have to be performed, increased power savings can be achieved. The selection of a collection of pixels to manipulate can be performed after some amount of use of the display panel 102 has occurred, based on the assumption that pixel deterioration is likely to occur after some amount of use of the display panel 102.

Each pixel represented by P in FIG. 1 can include a number of sub-pixels, where each sub-pixel includes a respective OLED in examples where the display panel 102 is an OLED display panel. In other examples, each pixel can include sub-pixels implemented with other types of light emitters.

The multiple OLEDs of a pixel can include OLEDs that are able to emit light of different colors when activated. For example, the different OLEDs can emit the following colors: red, green, and blue. In further examples, each pixel can additionally include an OLED to emit white light. In alternative examples, the OLEDs of the pixel can emit other colors. More generally, a pixel can include a single light emitter, or multiple light emitters for emitting different colors. Depending on the color desired for a given pixel, some combination of the OLEDs of the pixel can be activated.

In further examples, the pixels of the display panel can be divided into multiple groups of pixels, where each group of pixels corresponds to a respective zone (of multiple zones) of the display panel 102. Pixel manipulation can be performed independently for the respective zones.

Figure 2:
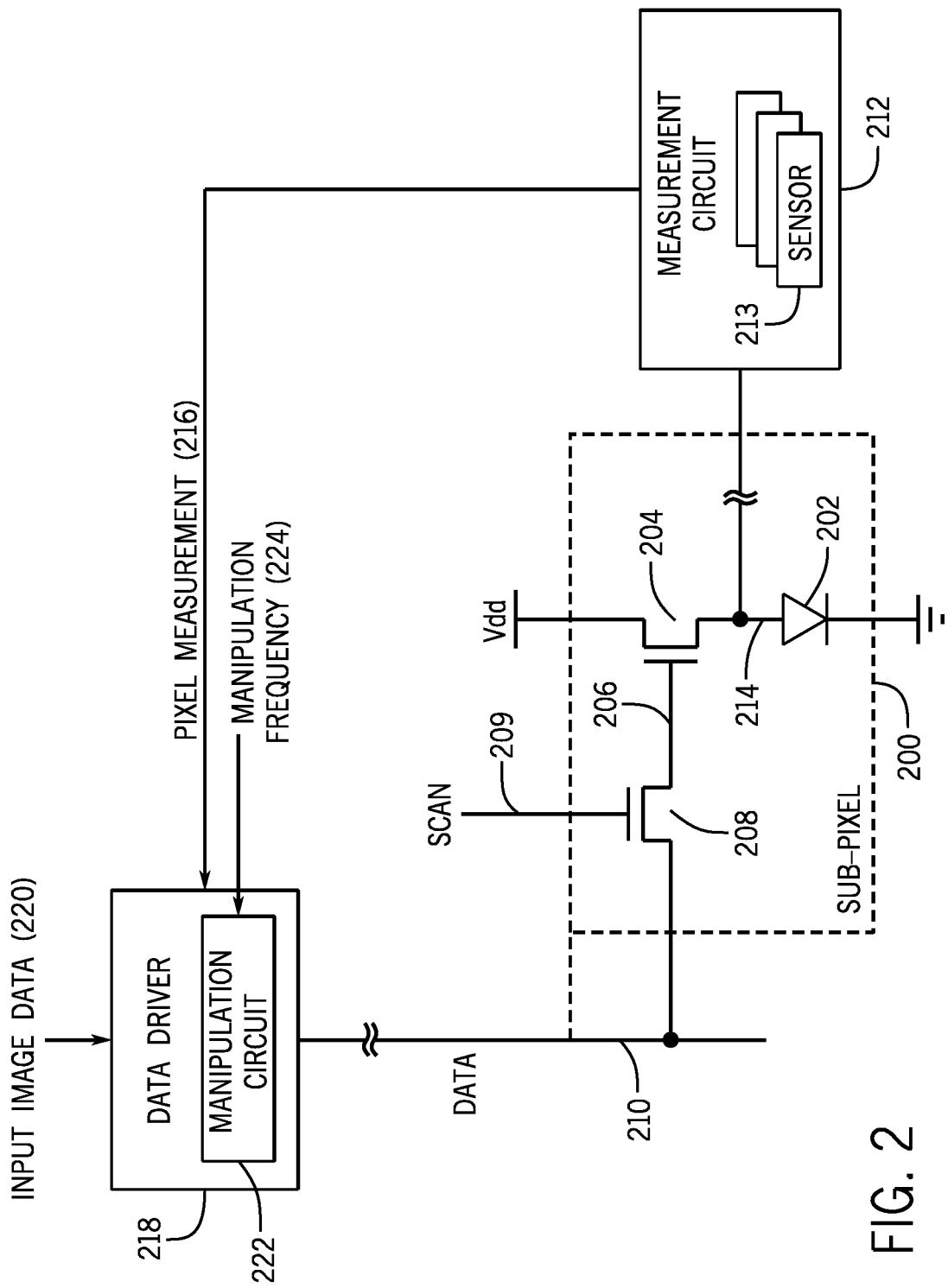
FIG. 2 is a block diagram of an arrangement to control a sub-pixel, according to further examples.

FIG. 2 illustrates an example of a sub-pixel 200, where the sub-pixel 200 includes an OLED 202 in examples where the display panel 102 is an OLED display panel. More generally, the element 202 can represent a light emitter that emits light when activated. A pixel can include a number of the sub-pixels 200 shown in FIG. 2.

A drive transistor 204 of the sub-pixel 200 is connected in series with the OLED 202. When the drive transistor 204 is turned on, in response to charging of a gate node 206 of the drive transistor 204 to an active state (e.g., a high voltage), electrical current is transferred through the OLED 202 between Vdd (a power supply voltage) and a reference voltage (e.g., ground). The current that passes through the OLED 202 causes the OLED to emit light. The intensity of the light emitted by the OLED 202 is proportional to the amount of current that is passed through the OLED 202, which in turn is based upon the drive voltage level provided at the gate node 206.

The sub-pixel 200 further includes a scan transistor 208 that connects a data line 210 to the gate node 206. The scan transistor 208 is connected to a scan signal 209, which when asserted to an active state (e.g., a high voltage) turns on the scan transistor 208 to transfer the voltage of the data line 210 to the gate node 206. The voltage level of the data line 210 determines the voltage level of the gate node 206. Thus, by adjusting the voltage level of the data line 210, the voltage level of the gate node 206 can be adjusted, and accordingly, the current that passes through the drive transistor 204 and the OLED 202 can also be adjusted.

The data line 210 is driven by a data driver 218 of the display panel 102. The data driver 210 drives multiple data lines, including the data line 210. The multiple data lines correspond to multiple columns of the array of pixels of the display panel 102. The voltage levels driven by the data driver 218 onto the data lines is based on an input image data 220 that corresponds to an image to be displayed by the display panel 102.

The scan signal 209 used to control the scan transistor 208 is driven by a scan driver (not shown), which is able to drive multiple scan signals that correspond to multiple rows of the array of pixels. Activation of a given scan signal causes a row of pixels to be activated. Although reference is made to scan signals as corresponding to rows and data lines as corresponding to columns, in other examples, scan signals can correspond to columns and data lines can correspond to rows.

As further shown in FIG. 2, in some examples, a measurement circuit 212 is coupled to a node 214 of the sub-pixel (such as through a sense transistor that is not shown). It is noted that the measurement circuit 212 and the data driver 218 can be part of the controller 104 shown in FIG. 1. In alternative examples, the measurement circuit 212 can be omitted, with the controller 104 selecting a collection of pixels (e.g., a random collection of pixels) for manipulation that is not based on pixel measurements.

In the ensuing discussion, reference is made to examples where pixel measurements are made, such as with the measurement circuit 212. More generally, pixel manipulation according to some implementations of the present disclosure can be performed with or without pixel measurements.

When the sense transistor is activated (such as during a measurement phase to measure characteristics of pixels of the display panel 102), a measurement sensor 213 (a voltage sensor or a current sensor) in the measurement circuit 212 can measure a voltage of the node 214, or of a current that passes through the node 214. Note that the measurement circuit 212 can include multiple measurement sensors to measure characteristics (voltage and/or current) of multiple sub-pixels.

The measured characteristic (e.g., voltage or current) of each sub-pixel 200 is provided as a pixel measurement 216 to the data driver 218. The pixel measurement 216 can be an analog signal or a digital value that represents the measured characteristic.

In other examples, a measurement sensor 213 of the measurement circuit 212 can include a light sensor, which is able to detect light (another example of a characteristic measured by the measurement circuit 212) emitted by the OLED 202. In such examples, the light sensor converts the measured light into the pixel measurement 216 that is provided to the data driver 218.

The data driver 218 receives the input image data 220, which represents an image to be displayed by the display panel 102. The data driver 218 includes a manipulation circuit 222, which is able to adjust a voltage level on data lines, including the data line 210, in response to the pixel measurement 216 from the measurement circuit 212.

If no adjustment or manipulation of the sub-pixel 200 is to be performed (in response to the pixel measurement 216 indicating that the sub-pixel 200 is operating as expected and has not suffered deterioration), then the data driver 218 provides a voltage on the data line 210 that corresponds to a respective portion of the image data 220 for the sub-pixel 200.

However, if the pixel measurement 216 indicates that the sub-pixel 200 has deteriorated and is to be manipulated, then the manipulation circuit 222 can adjust the voltage of the data line 210, where the adjustment takes into account the portion of the image data 220 as well as the pixel measurement 216. For example, if the pixel measurement 216 indicates that the sub-pixel 200 is generating an amount of light that is less than expected or that is shifted in color, then the manipulation circuit 222 can adjust the voltage level on the data line 210. For example, if the portion of the image data 220 has a value that would normally cause the driver 218 to drive voltage V1 onto the data line 210, the manipulation circuit 222 can make an adjustment to drive a voltage V1', which is V1 multiplied by a correction factor CF based on the pixel measurement 216.

The manipulation circuit 222 also receives a manipulation frequency 224, which can be set by the pixel manipulation frequency adjuster 106 of FIG. 1 as discussed above. The manipulation frequency 224 indicates to the manipulation circuit how frequently manipulation of pixels is to occur. Note that the manipulation of pixels includes a measurement phase (to make measurements by the measurement circuit 212) and an adjustment phase (to adjust pixels based on the pixel measurements). In some examples, the manipulation frequency 224 indicates how frequently both the measurement phase and the adjustment phase are to be performed. In other examples, the measurement phase and the adjustment phase can be performed at different respective frequencies that are adjustable, such as in response to the control element indication 108 (or multiple control element indications).

Figure 3:
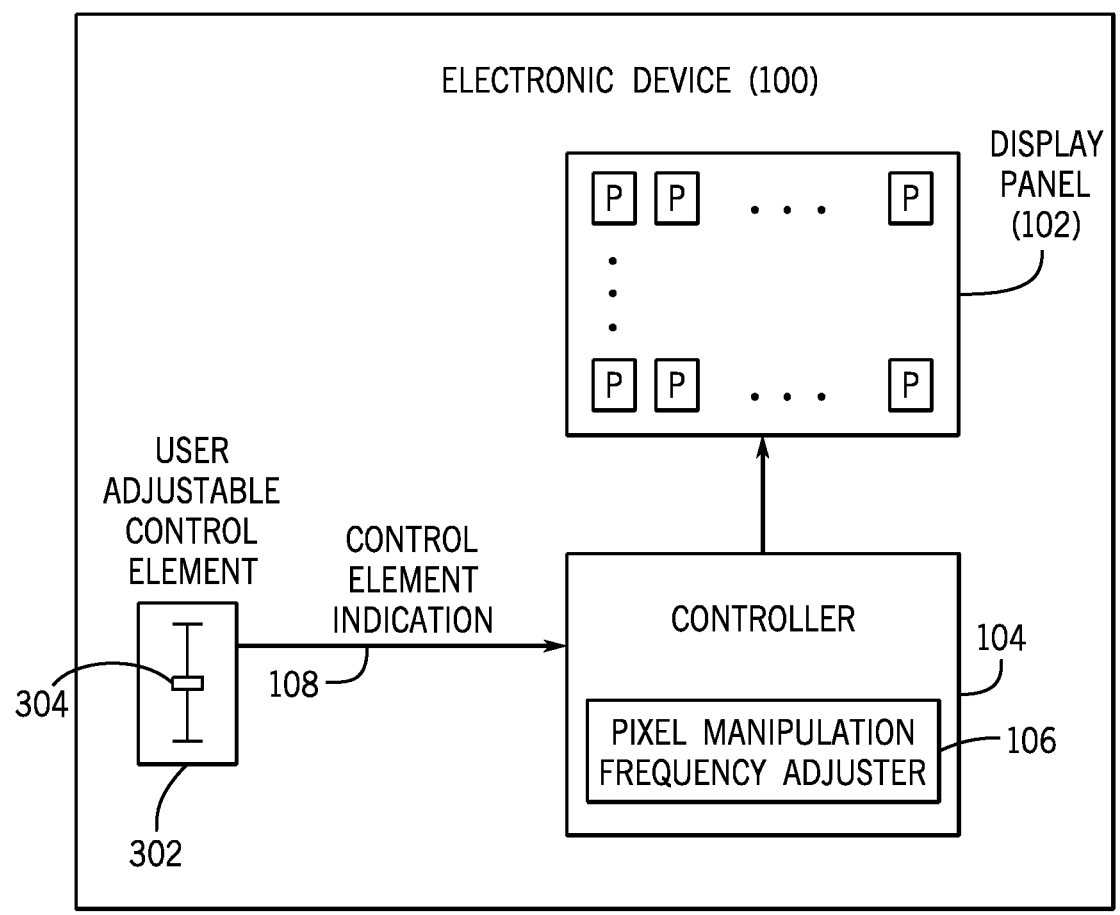
FIG. 3 is a block diagram of an electronic device that includes a controller for controlling manipulation of pixels according to additional examples.

FIG. 3 is a block diagram of the electronic device 100 according to further examples. The electronic device 100 of FIG. 3 is similar to the electronic device 100 of FIG. 1, except that in FIG. 3, a user adjustable control element 302 is depicted. The user adjustable control element 302 can be a physical control element that can be physically manipulated by a user, such as a knob, a slider, a control button, and so forth. In other examples, the user adjustable control element 302 can be a user interface element displayed on the display panel 102. In examples where the display panel 102 is a touch-sensitive display panel, a user can touch the displayed user adjustable control element 302 to adjust the control element 302. In other examples, a user can use a different user input device, such as a keyboard, a pointer device, a touch pad, and so forth, to adjust the displayed user adjustable control element 302 between multiple different settings.

In examples according to FIG. 3, the user adjustable control element 302 includes a slider 304, which can be a physical slider or a displayed slider as displayed by the display panel 102. The slider 304 can be moved in response to user manipulation to a selected setting of multiple settings that correspond to different display quality levels. For example, a first setting can indicate a first display quality level, while a second setting can indicate a second display quality level, where the first and second display quality levels are different display quality levels.

In response to the control element indication 108 corresponding to user selection of the control element 302 being to a first setting corresponding to a first display quality level, the pixel manipulation frequency adjuster 106 of the controller 104 is to set a first frequency of manipulation of the pixels of the display panel 102. In response to the control element indication 108 corresponding to user selection of the control element 302 to a second display quality level higher than the first display quality level, the pixel manipulation frequency adjuster 106 is to set a second frequency of manipulation of the pixels of the display panel 102, where the second frequency is higher than the first frequency. It is noted that the first and second frequencies noted above are non-zero frequencies.

In further examples, there can be additional settings of the control element 302 that correspond to additional different display quality levels. These additional settings can cause the pixel manipulation frequency adjuster 106 to set corresponding different frequencies of manipulation of the pixels of the display panel 102.

Manipulation of pixels can include manipulation of sub-pixels of a pixel, where the manipulation of the sub-pixels can be performed on an individual basis, such that a first sub-pixel can be manipulated while a second sub-pixel is not manipulated.

Manipulation of the sub-pixels can include adjusting intensities of the sub-pixels, where adjusting intensities of the sub-pixels can be achieved by adjusting the electrical current passing through an OLED, such as the OLED 202 of FIG. 2. More generally, adjusting the intensity of a sub-pixel can refer to adjusting an amount of light that is emitted by a light emitter, where the adjustment can be based on controlling an attribute of the light emitter, such as a voltage or a current that is provided to the light emitter.

Figure 4:
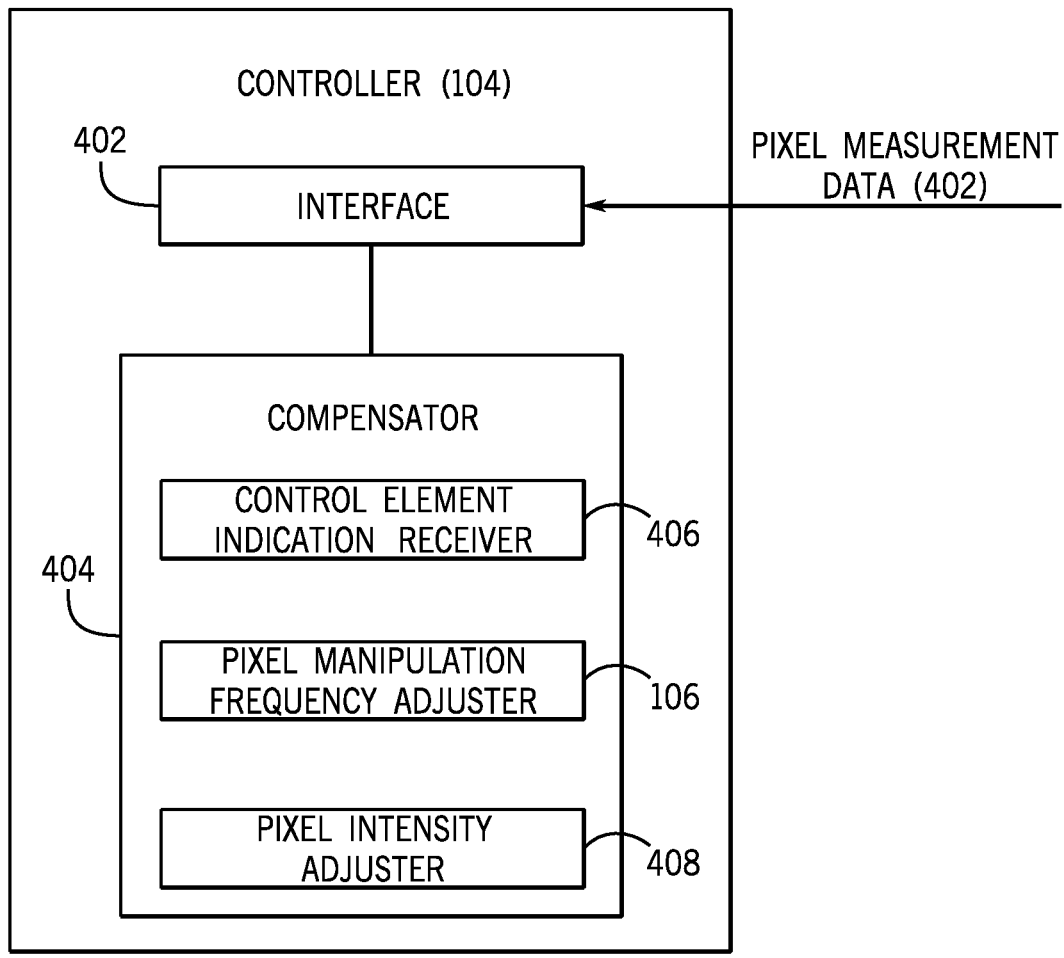
FIG. 4 is a block diagram of a controller according to some examples.

FIG. 4 is a block diagram of an example of the controller 104, according to some implementations. The controller 104 includes an interface 402 that is to receive pixel measurement data 402, such as from the measurement sensors 213 of the measurement circuit 212 of FIG. 2. The interface 402 can include any type of receiver that is able to receive the pixel measurement data 402 over one or multiple signal lines.

The controller 104 further includes a compensator 404. The compensator 404 includes a control element indication receiver 406 to receive an indication that is responsive to a user selection of a control element (e.g., the control element 302 of FIG. 3) adjustable between settings corresponding to different display quality levels. The compensator 404 further includes a pixel manipulation frequency adjuster 106, similar to the pixel manipulation frequency adjuster 106 of FIG. 1. The pixel manipulation frequency adjuster 106 adjusts, in response to the received control element indication as received by the control element indication receiver 406, a frequency of manipulation of the pixels of the display panel 102 to compensate for deterioration of the pixels (e.g., deterioration caused by burn-in, color shift, and so forth) indicated by the measurement data.

The compensator 404 further includes a pixel intensity adjuster 408 to adjust intensity of the pixels as part of the manipulation. The adjusting of the intensities can include changing voltage or current levels provided to the pixels to activate the pixels.

Figure 5:
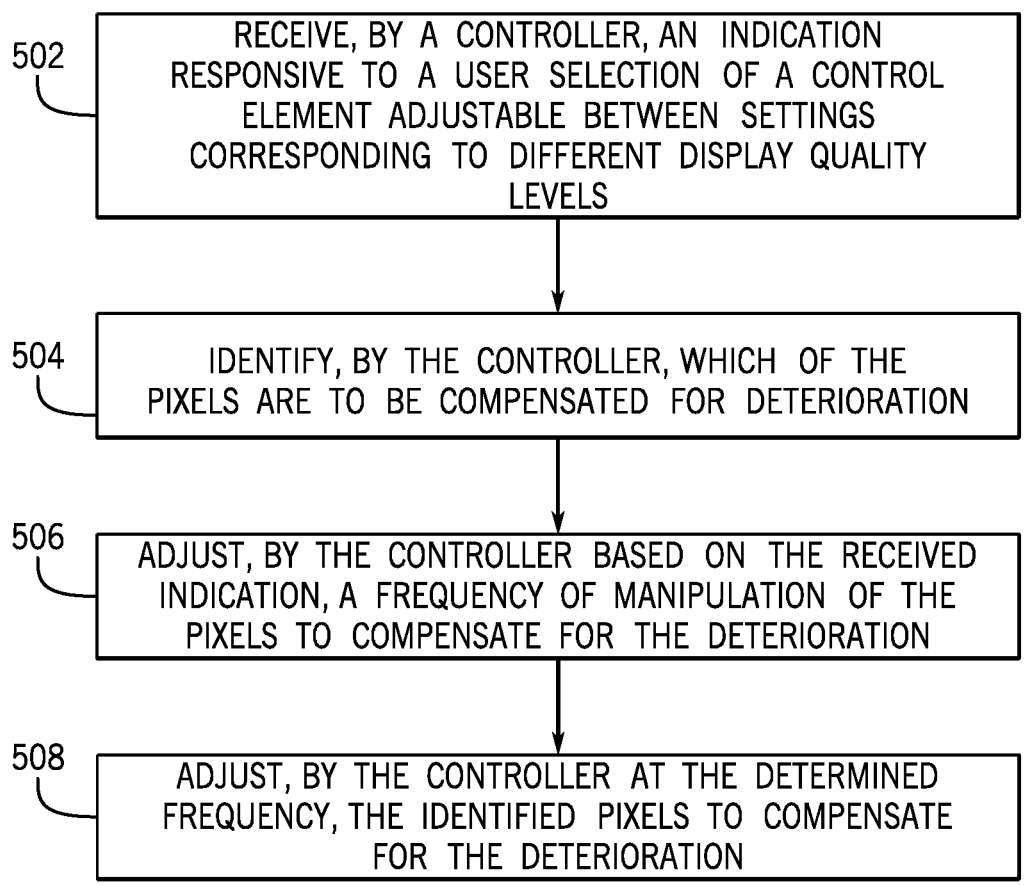
FIG. 5 is a flow diagram of a process of controlling manipulation of pixels, according to some examples.

FIG. 5 is a flow diagram of a process of manipulating pixels of the display panel according to some implementations. The process of FIG. 5 includes receiving (at 502), by a controller (e.g., the controller 104) an indication responsive to a user selection of a control element (e.g., the control element 302) adjustable between settings corresponding to different display quality levels.

The process further includes identifying (at 504), by the controller, which of the pixels are to be compensated for deterioration. In some examples, the identification of which pixels are to be compensated for deterioration can be based on measurement data from measurement sensors (e.g., the measurement sensors 213 of FIG. 2) associated with pixels of a display device. Measured characteristics represented by the measurement data can include measured voltages or measured currents of respective pixels or sub-pixels. In alternative examples, the identification of which pixels are to be compensated for deterioration can be based on a random or other selection of a subset of the pixels.

The process further includes adjusting (at 506), by the controller based on the received indication responsive to a user selection of a control element (e.g., the control element 302), a frequency of manipulation of the pixels to compensate for the deterioration. The process further includes adjusting (at 508), by the controller, at the determined frequency, the identified pixels to compensate for the deterioration. Note that adjusting identified pixels can refer to adjusting sub-pixels.

In examples where tasks of the controller 104 are performed by machine-readable instructions, the machine-readable instructions can be stored in a non-transitory machine-readable or computer-readable storage medium. The storage medium can be implemented using any or some combination of the following: a semiconductor memory device such as a dynamic or static random access memory (DRAM or SRAM), an erasable and programmable read-only memory (EPROM), an electrically erasable and programmable read-only memory (EEPROM) and a flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An electronic device comprising:
a display panel comprising a plurality of pixels; and
a controller to:
receive indications responsive to user selections of a control element adjustable between settings corresponding to different display quality levels;
when a received indication corresponds to a user selection of a first setting corresponding to a first display quality level of the different display quality levels:
select a first number of pixels of the plurality of pixels,
set a first frequency of manipulation of the first number of pixels, and
manipulate the first number of pixels according to the first frequency of manipulation to compensate for deterioration of the first number of pixels; and
when a received indication corresponds to a user selection of a second setting corresponding to a second display quality level of the different display quality levels:
select a second number of pixels of the plurality of pixels, the second number of pixels having a quantity of pixels different from the first number of pixels,
set a second frequency of manipulation of the second number of pixels, the second frequency different from the first frequency, and
manipulate the second number of pixels according to the second frequency of manipulation to compensate for deterioration of the second number of pixels.

2. The electronic device of claim 1, wherein the control element comprises a user interface element that is displayed by the display panel.

3. The electronic device of claim 1, wherein the first frequency is a first non-zero frequency, and the second frequency is a second non-zero frequency higher than the first non-zero frequency.

4. The electronic device of claim 1, wherein each pixel of the first number of pixels includes plural sub-pixels of different colors, wherein the manipulation of the first number of pixels comprises manipulation of the sub-pixels of the first number of pixels.

5. The electronic device of claim 4, wherein the manipulation of the sub-pixels comprises manipulating the sub-pixels of the first number of pixels on an individual basis, such that a first sub-pixel is manipulated while a second sub-pixel is not manipulated.

6. The electronic device of claim 5, wherein the manipulation of the sub-pixels comprises adjusting intensities of the sub-pixels.

7. The electronic device of claim 1, wherein the display panel comprises measurement sensors to measure characteristics of the plurality of pixels, and wherein the manipulation of the first number of pixels and the second number of pixels is based on measurement data from the measurement sensors.

8. The electronic device of claim 1, wherein the plurality of pixels comprise organic light emitting diodes.

9. A controller to control a display device having a plurality of pixels, comprising:
a processor; and
a non-transitory storage medium storing instructions executable on the processor to:
receive indications responsive to user selections of a control element adjustable between settings corresponding to different display quality levels;
when a received indication corresponds to a user selection of a first setting corresponding to a first display quality level of the different display quality levels:
select a first number of pixels of the plurality of pixels,
set a first frequency of manipulation of the first number of pixels, and
adjust intensities of the first number of pixels according to the first frequency of manipulation to compensate for deterioration of the first number of pixels; and
when a received indication corresponds to a user selection of a second setting corresponding to a second display quality level of the different display quality levels:
select a second number of pixels of the plurality of pixels, the second number of pixels having a quantity of pixels different from the first number of pixels,
set a second frequency of manipulation of the second number of pixels, the second frequency different from the first frequency, and
adjust intensities of the second number of pixels according to the second frequency of manipulation to compensate for deterioration of the second number of pixels.

10. The controller of claim 9, wherein the adjusting of the intensities of the first number of pixels comprises changing voltage levels or current levels provided to the first number of pixels to activate the first number of pixels.

11. The controller of claim 9, wherein each pixel of the first number of pixels includes plural sub-pixels of different colors, and wherein the adjusting of the intensities of the first number of pixels comprises intensities of the plural sub-pixels of a pixel on an individual basis.

12. The controller of claim 9, wherein the compensating for the deterioration of the first number of pixels comprises compensating for burn-in of the first number of pixels or color shift of the first number of pixels.

13. A method for a display device having a plurality of pixels, comprising:
receiving, by a controller, indications responsive to user selections of a control element adjustable between settings corresponding to different display quality levels;
when a received indication corresponds to a user selection of a first setting corresponding to a first display quality level of the different display quality levels:
selecting, by the controller, a first number of pixels of the plurality of pixels,
setting, by the controller, a first frequency of manipulation of the first number of pixels, and
adjusting, by the controller at the first frequency, the first number of pixels to compensate for deterioration of the first number of pixels; and
when a received indication corresponds to a user selection of a second setting corresponding to a second display quality level of the different display quality levels:
selecting, by the controller, a second number of pixels of the plurality of pixels, the second number of pixels having a quantity of pixels different from the first number of pixels,
setting, by the controller, a second frequency of manipulation of the second number of pixels, the second frequency different from the first frequency, and
adjusting, by the controller at the second frequency, the second number of pixels to compensate for deterioration of the second number of pixels.

14. The method of claim 13, further comprising:
measuring, by measurement sensors associated with the plurality of pixels of the display device, characteristics of the plurality of pixels,
wherein adjusting the first number of pixels is based on measurement data from the measurement sensors for the first number of pixels.

15. The electronic device of claim 1, wherein the selecting of the first number of pixels is of a first random number of pixels.

16. The electronic device of claim 15, wherein the selecting of the second number of pixels is of a second random number of pixels.

17. The electronic device of claim 1, wherein the second number of pixels include a different percentage of a total number of the plurality of pixels than the first number of pixels.

18. The controller of claim 9, further comprising:
an interface to receive measurement data from sensors that measure characteristics of the plurality of pixels of the display device,
wherein the adjusting of the intensities of the first number of pixels is based on measurement data from the sensors for the first number of pixels, and
wherein the adjusting of the intensities of the second number of pixels is based on measurement data from the sensors for the second number of pixels.

19. The method of claim 13, wherein the selecting of the first number of pixels is of a first random number of pixels, and wherein the selecting of the second number of pixels is of a second random number of pixels.

20. The method of claim 13, wherein the second number of pixels include a different percentage of a total number of the plurality of pixels than the first number of pixels.

* * * * *